US012769266B2

(12) United States Patent
Chakrabarty et al.

(10) Patent No.: US 12,769,266 B2
(45) Date of Patent: Oct. 20, 2026

(54) STOCHASTIC CONTROL SUBJECT TO GENERATIVE AI-BASED DISTURBANCE

(71) Applicant: Mitsubishi Electric Research Laboratories, Inc., Cambridge, MA (US)

(72) Inventors: Ankush Chakrabarty, Bedford, MA (US); Ye Wang, Andover, MA (US); Christopher Laughman, Waltham, MA (US); Toshiaki Koike Akino, Boston, MA (US); Gordon Wichern, Boston, MA (US); Alessandro Salatiello, Cambridge, MA (US); Farshud Sorourifar, Columbus, OH (US); Joel Paulson, Columbus, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 363 days.

(21) Appl. No.: 18/533,297

(22) Filed: Dec. 8, 2023

(65) Prior Publication Data

US 2025/0189943 A1 Jun. 12, 2025

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01)

(58) Field of Classification Search
CPC .... G05B 13/048; G05B 13/027; G06N 3/045; G06N 7/01; G06N 3/0455; G06N 3/047
USPC ........................................................... 700/28
See application file for complete search history.

(56) References Cited

U.S. PATENT DOCUMENTS

2019/0041811 A1* 2/2019 Drees .................. G05B 13/027
2021/0096518 A1* 4/2021 Ilani ....................... G06N 3/045
2022/0100877 A1* 3/2022 Qiu ....................... G06F 21/629
2022/0222520 A1* 7/2022 Min ....................... G06N 3/045

* cited by examiner

*Primary Examiner* — Jigneshkumar C Patel
(74) *Attorney, Agent, or Firm* — Gene Vinokur

(57) ABSTRACT

The predictive controller determines, using the deep generative decoder model, a conditional probabilistic distribution of the latent representations of the disturbance conditioned on the partial observations of the disturbance, and samples the conditional probabilistic distribution of the latent representations to produce a latent sample of the time-series values of the disturbance affecting the mechanical system over the time horizon. The predictive controller decodes the latent sample with the deep generative decoder model to produce predicted values of the disturbance acting on the system within the time horizon with a probability of the latent sample on the conditional probabilistic distribution of the latent representations and controls the mechanical system using a predictive controller that determines control commands changing a state of the operation of the mechanical system using the probability of at least some of the predicted values of the disturbance.

20 Claims, 13 Drawing Sheets

1000

Algorithm 1 $\tau$-SMPC

Require:

measured disturbances: $W_{0:t}$, generative model: $\hat{G}_\theta$, number of latent samples: $m$, uncertainty propagation strategy: $\mathcal{B}$.

for $i$ in $m$ do take random samples: $z_i \leftarrow \mathcal{N}(0, 1)$ compute probabilities: $\bar{\Pi}_i = \pi(z_i | W_{0:t}, c)$ generate uncertainty scenario: $\bar{W}_{0:t,i} = \hat{G}_\theta(z_i)_{0:t}$ end for normalize probabilities: $\boldsymbol{\omega} = \bar{\Pi} / \sum_i \bar{\Pi}_i$ select scenarios for OCP: $\{\hat{W}_j, \omega_j\}_{j=1}^{n_p} \leftarrow \mathcal{B}(\hat{W}_{0:t}, \boldsymbol{\omega})$ Solve OCP with scenarios and weights $\{\hat{W}_j, \omega_j\}_{j=1}^{n_p}$

FIG. 11

1241

1231

$$\min_{u_{0|t},\ldots,u_{T-1|t}} \sum_{s=1}^{n_s} \omega^{(s)} \sum_{k=0}^{T-1} \ell_k(\hat{x}_{k|t}^{(s)}, u_k^{(s)}, \hat{w}_t^{(s)}),$$

subject to the constraints:

1211

1221

$$\hat{x}_t^{(s)} = x_t,$$

$$\hat{x}_{k+1}^{(s)} = f\left(\hat{x}_k^{(s)}, u_k^{(s)}, \hat{w}_k^{(s)}\right),$$

$$u_k^{(s)} \in \mathcal{U}, \quad \forall k = t, \ldots, T, \quad \forall s = 1, \ldots, n_s$$

$$g(\hat{x}_k^{(s)}, u_k^{(s)}) \leq 0,$$

Scenario-Tree Stochastic MPC Problem

FIG. 12

STOCHASTIC CONTROL SUBJECT TO GENERATIVE AI-BASED DISTURBANCE

TECHNICAL FIELD

The invention relates generally to control applications, and more particularly to methods and apparatus for stochastic model-predictive control of dynamics of a mechanical system in response to an estimated uncertainty of disturbance acting on the mechanical system.

BACKGROUND

Optimization-based control and estimation techniques, such as model predictive control (MPC), allow a model-based design framework in which the system dynamics and constraints can directly be taken into account. MPC is used in many applications to control dynamical systems of various complexities, where the systems are described by a set of nonlinear differential equations, i.e., a system of ordinary differential equations (ODE), differential-algebraic equations (DAE), or partial differential equations (PDE). Examples of such systems include production lines, car engines, robots, numerically controlled machining, satellites, and power generators.

The MPC is based on a real-time finite-horizon optimization of a model of a system. The MPC has the ability to anticipate future events and to take appropriate control actions. This is achieved by optimizing the operation of the system over a future finite time horizon subject to constraints, and only implementing the control over a current time step.

The MPC can predict the change in state variables of the modeled system caused by changes in control variables. The state variables define a state of the system, i.e., a state of a controlled system is the smallest set of state variables in the state-space representation of the control system that can represent the entire state of the system at any given time. For example, if a controlled system is an autonomous vehicle, the state variables may include position, velocity, and heading of the vehicle. The MPC uses models of the system, the current system measurements and/or state estimates, the current state of the vehicle, and state and control constraints to calculate future changes in the state of the vehicle. These changes are calculated to hold the state close to the target subject to constraints on both control and state variables. The MPC typically sends out only the first change in each control variable to be implemented by actuators of the controlled system and repeats the calculation when the next change is required.

Many systems to be controlled are partially unknown, or at least uncertain. E.g., when controlling a vehicle both the maximum friction between tire and road is not exactly known, and furthermore, the dependence of the friction on the state of the vehicle, e.g., the velocity of the vehicle, is also not known. Typically, such uncertainties are estimated concurrently with the MPC, to give the MPC a better knowledge of the model it controls. Although MPC exhibits inherent robustness due to feedback, such controllers do not take uncertainties directly into account and, consequently, the satisfaction of safety-critical constraints cannot be guaranteed in the presence of model uncertainties or external disturbances. One alternative approach is robust MPC, which relies on the optimization of control policies under worst-case scenarios in the presence of a bounded range of uncertainty. However, robust MPC can lead to conservative control performance, due to the worst-case scenarios occurring with an extremely small probability.

Another type of MPC is stochastic MPC (SMPC), where the uncertainty of the system is modeled to have a distribution, e.g., the distribution can be the Gaussian distribution having a mean (center) and a covariance (uncertainty). SMPC aims at reducing the conservativeness of robust MPC by directly incorporating the probabilistic description of uncertainties into the optimal control problem (OCP) formulation. In some implementations, the SMPC requires constraints to be satisfied with a certain probability, i.e., by formulating so-called chance constraints that allow for a specified, yet non-zero, probability of constraint violation. In addition, SMPC is advantageous in settings where high performance in closed-loop operation is achieved near the boundaries of the plant's feasible region. In the general case, chance constraints are computationally intractable and typically require an approximate formulation.

In addition to many systems having uncertain parameters or components, disturbance acting on the mechanical system is often uncertain as well. While there are a number of methods for estimating the uncertainty of the parameters or components of the system, these methods depend on the dynamic of the system, while the uncertainty of the disturbance can be independent of the system dynamics.

In addition, some SMPC solvers assume the uncertainty is predetermined offline, i.e., prior to executing the controller. In case of disturbances, such an assumption is overly restrictive, as in numerous applications the uncertainties change with time and can hence not be predetermined offline prior to executing the SMPC.

Accordingly, there is a need to include the externally determined uncertainty of the disturbance acting on a mechanical system in the SMPC solver during the real-time control of the mechanical system.

SUMMARY

It is an object of some embodiments to provide a system and a method for controlling the operation of a mechanical system subject to the uncertainty of a disturbance acting on the system. Examples of disturbances include wind acting on a drone or used by a windmill, vibration caused by an operating elevator and/or drilling machine, internal heat loads, or ambient conditions affecting the operation of air conditioning systems.

Predictive controller design depends on the quality of disturbance predictions, i.e., forecasts of the disturbance acting on a system within a prediction horizon used by the predictive controller. Such a prediction is challenging and several predictive controllers just assume some future disturbance values. For example, some controllers fix the predicted value of disturbance in advance. Other controllers place a bound on the variation of the disturbance and use this bound in determining the control inputs. These control methods, however, may be inaccurate and ill-equipped to handle the disturbance variations.

Some control methods, like stochastic model predictive control (SMPC), aim to address this deficiency by constructing a probabilistic model of the disturbance to draw the samples from that model. However, to the best of our knowledge, the SMPC formulations assume that the disturbances are generated in advance, i.e., before the control, by simplified stochastic processes that may not reflect the observed data. While these simplifications may result in tractable controller design frameworks, they often result in deteriorated performance for disturbance inputs that do not conform to the measurements.

Indeed, while disturbance modeling efforts that adopt a probabilistic perspective are advantageous over deterministic predictions, such probabilistic models are often applicable only in data-rich settings or involve making simplifying assumptions on the underlying stochasticity of the underlying disturbance signals.

Some embodiments are based on the understanding that during the operation of the system under control, the disturbance can be partially observed. For example, the disturbance acting on a system can be measured till the current instance of time, i.e., over a portion of the prediction horizon. These partial measurements and/or partial observations of the disturbance can be used to update the assumptions on the underlying stochasticity, i.e., to update a probabilistic distribution defining the model of the disturbance.

However, such an update on an arbitrarily shaped probabilistic model of the disturbance is challenging. Hence, to make such an update during the online control of the operation of the system, there is a need to assume the structure of the model of the disturbance. One example of such a structure is an assumption that a probabilistic model of the disturbance is a Gaussian distribution. Hence, the objective of the model update would be to update the parameters of the distribution, e.g., mean and variance of the Gaussian distribution, conditioned on partial observation of the disturbance. Such an update is possible, but the result would not be reliable since the disturbance rarely comes from the Gaussian distribution and any assumption on the structure of the statistical model of the disturbance can be incorrect.

Some embodiments are based on recognizing that measurements of time-series data indicative of disturbance have at least some unknown relationship in the time domain. An example of such a relationship can be observed in sensors measuring power plant operation where future variation in the loads depends on the current values of the loads. Some embodiments are based on the recognition that determining the unknown relationship is challenging as measurements in the original data space of the sensors are noisy and the unknown relationship includes a complex non-linear transformation. For example, in the case of the power plant, the thermodynamic relationship in the power plant is complex and requires extensive domain knowledge to elucidate. Such complex interdependency makes the recovery of the relationship, in the original data space, unreliable. Hence, the assumption of the parameterized structure of the distribution capturing this relationship is unreliable as well.

Some embodiments are based on the realization that efficient encoding of measurements of the sensors may find a relationship among the measurements because encoding methods are used to find reduced-order embeddings of data that summarize their relationships in the original data space. In addition, some embodiments are based on realizing that if the reduced-order embeddings of measurements may better represent the relationship among the measurements, the incorrect assumption of a structure of a probabilistic model of the disturbance in the measurement domain, e.g., the original domain, may become correct in the domain of the reduced-order embeddings of the measurements.

After some testing and experiments, some embodiments are based on the understanding that there is latent space of reduced-order embeddings of the original measurements of the disturbance where the latent representation of the disturbance can be modeled on a parameterized distribution with sufficient accuracy suitable for control applications. Hence, instead of trying to determine an unstructured distribution of disturbances conditioned on the partial observations in the original space of measurements, it is advantageous to determine the parameterized distribution of the latent representation of the disturbances in the latent space conditioned on the partial observations in the original measurement domains.

To perform such an estimation, some embodiments use a mapping between the latent and the original space determined offline as a deep generative decoder model. Some embodiments are based on the realization that an autoencoder can determine such an efficient mapping in an unsupervised manner. The autoencoder is a type of artificial neural network used to learn efficient data codings in an unsupervised manner. The autoencoder includes an encoder and a decoder. The encoder encodes input data from the original data space into a latent space represented by the vector of numerical values 'h'. The decoder decodes the encodings from the latent space to an estimate of the input data, i.e., reconstructs the input data. In other words, the encoder and/or decoder provide a mapping between the data in the original data space and a latent space representation of the data. To that end, the autoencoder determines an efficient latent space suitable to capture the relationship between different instances of the input data.

The principles of the autoencoder can be extended to deep generative models, such as conditional variational autoencoders (CVAEs), to provide an expressive and automated approach for learning distributions in the latent space from data measured in the original space. However, the encoder and decoder of CVAE are trained on complete sequences of observation of disturbances. As used herein, the complete sequence of observations of disturbances provides values of the disturbances for the entire time and/or prediction horizon, while partial observations provide values of the disturbances only for a portion of the time horizon. During the execution, an encoder cannot be used to encode partial observation, i.e., due to the training on the complete sets. However, the decoder model of CVAE can be used to test estimations of the parameterized distribution in the latent space conditioned on the partial observation of the disturbance. Hence, the technology of the CVAE trained on complete sequences of observations can be extended to partial observations. As a result, by sampling the learned latent space, some embodiments can generate unseen disturbance realizations.

Accordingly, in one general aspect, method may include collecting partial observations of the disturbance affecting the operation of the mechanical system over an observed portion of a time horizon. Method may also include collecting a deep generative decoder model defining a mapping from a latent space of latent representations of time-series values of the disturbance affecting the mechanical system over the time horizon to a measurement space of the partial observations of the disturbance. Method may furthermore include determining, using the deep generative decoder model, a conditional probabilistic distribution of the latent representations of the disturbance conditioned on the partial observations of the disturbance. Method may in addition include sampling the conditional probabilistic distribution of the latent representations to produce a latent sample of the time-series values of the disturbance affecting the mechanical system over the time horizon. Method may moreover include decoding the latent sample with the deep generative decoder model to produce predicted values of the disturbance acting on the system within the time horizon with a probability of the latent sample on the conditional probabilistic distribution of the latent representations. Method may also include controlling the mechanical system using a predictive controller that determines control commands changing a state of the operation of the mechanical system using the probability of at least some of the predicted values of the disturbance. Other embodiments of this aspect include corresponding computer systems, apparatus, and computer programs recorded on one or more computer storage devices, each configured to perform the actions of the methods.

In one general aspect, device may include one or more processors configured to: collect partial observations of the disturbance affecting the operation of the mechanical system over an observed portion of a time horizon; collect a deep generative decoder model defining a mapping from a latent space of latent representations of time-series values of the disturbance affecting the mechanical system over the time horizon to a measurement space of the partial observations of the disturbance; determine, using the deep generative decoder model, a conditional probabilistic distribution of the latent representations of the disturbance conditioned on the partial observations of the disturbance; sample the conditional probabilistic distribution of the latent representations to produce a latent sample of the time-series values of the disturbance affecting the mechanical system over the time horizon; decode the latent sample with the deep generative decoder model to produce predicted values of the disturbance acting on the system within the time horizon with a probability of the latent sample on the conditional probabilistic distribution of the latent representations; and control the mechanical system using a predictive controller that determines control commands changing a state of the operation of the mechanical system using the probability of at least some of the predicted values of the disturbance. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 11 shows a pseudo-code for performing SMPC using scenario trees according to some embodiments.

FIG. 12 shows a pseudo-code for exemplar implementation scenario trees of SMPC of FIG. 11 for building energy control according to some embodiments.

DETAILED DESCRIPTION

Figure 1:
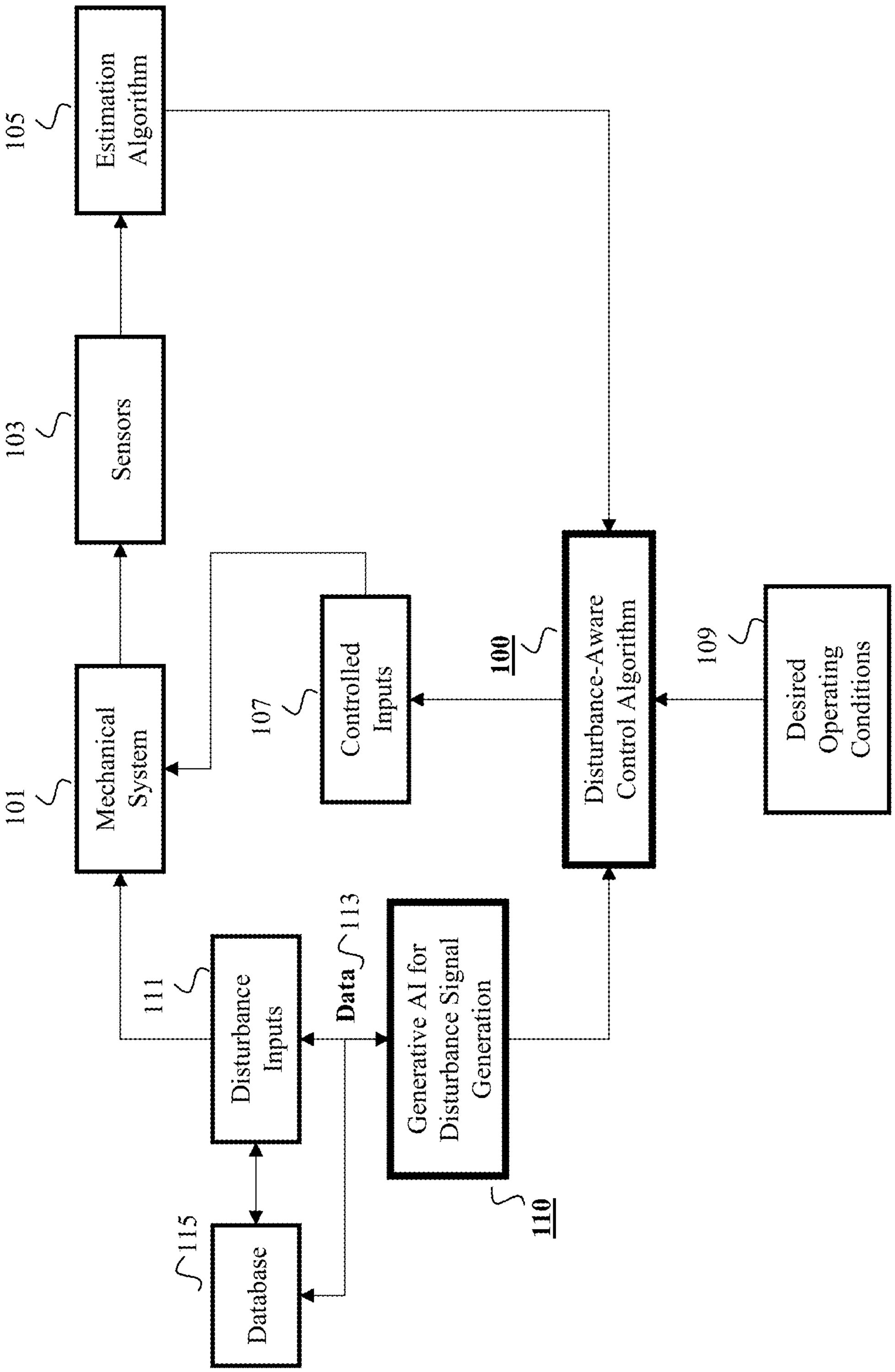
FIG. 1 shows a schematic of an overview of disturbance-aware control employed by some embodiments.

FIG. 1 shows a schematic of an overview of disturbance-aware control employed by some embodiments. The embodiments aim to control a mechanical system 101 that may be described by a model of the dynamics represented by $$x_{k+1} = f(x_k, u_k, w_k)$$

where $x_k \in \mathbb{R}^{n_x}$ denotes the current and state of the system, some of which may be measured by sensors 103, using which estimates of the entire state can be obtained using a state estimation algorithm 105. The vector $u_k \in \mathbb{R}^{n_u}$ denotes a set of control decisions or controlled inputs 107, and $w_k \in \mathbb{R}^{n_w}$ denotes the exogenous disturbances 111 which affect the system at the current time k.

For example, the mechanical system can be a thermodynamic system conditioning energy within a building, and the model f may describe the thermal dynamics of an air-conditioned zone in the building, wherein the states of the system x include room air temperature, interior wall surface temperature, and exterior wall core temperatures. The control input u could be the net heating and cooling power of a heat pump, while the disturbance input vector w could be one or a combination of the outside air temperature, solar radiations, airflow, and internal heat loads due to the presence of occupants and heat-generating appliances.

It is the objective of a disturbance-aware control algorithm 100 to achieve desired building operating conditions 109 based on estimates of the states, sensor measurements, and predictions of disturbance inputs. These predictions are generated using generative AI 110 that are trained on data that includes: disturbance inputs 111 potentially measured from the mechanical system 101 in real-time, or disturbance inputs that have been previously stored in a database 115 collected offline, either from the building energy system 101 in the past, or alternative data sources.

Figure 2:
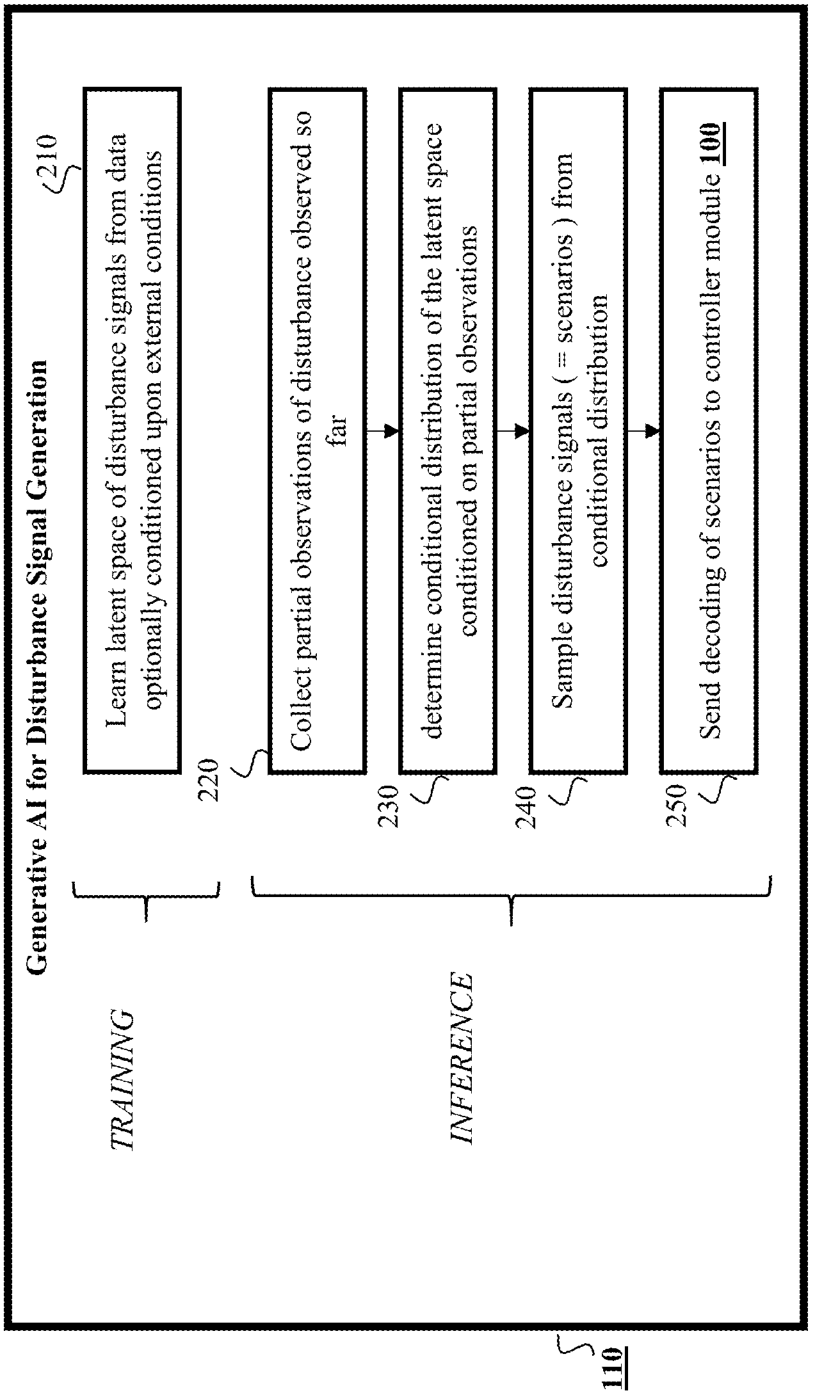
FIG. 2 shows a schematic of the training and inference stages of employing generative ai for disturbance signal generation according to some embodiments.

FIG. 2 shows a schematic of the training and inference stages of employing generative ai for disturbance signal generation according to some embodiments. Some embodiments are based on recognizing that measurements of time-series data indicative of disturbance have at least some unknown relationship in the time domain. An example of such a relationship can be observed in sensors measuring power plant operation where future variation in the loads depends on the current values of the loads. Some embodiments are based on the recognition that determining the unknown relationship is challenging as measurements in the original data space of the sensors are noisy and the unknown relationship includes a complex non-linear transformation. For example, in the case of the power plant, the thermodynamic relationship in the power plant is complex and requires extensive domain knowledge to elucidate. Such complex interdependency makes the recovery of the relationship, in the original data space, unreliable. Hence, the assumption of the parameterized structure of the distribution capturing this relationship is unreliable as well.

Some embodiments are based on the realization that efficient encoding of measurements of the sensors may find a relationship among the measurements because encoding methods are used to find reduced-order embeddings of data that summarize their relationships in the original data space. In addition, some embodiments are based on realizing that if the reduced-order embeddings of measurements may better represent the relationship among the measurements, the incorrect assumption of a structure of a probabilistic model of the disturbance in the measurement domain, e.g., the original domain, may become correct in the domain of the reduced-order embeddings of the measurements.

To that end, during the training stage of the control process performed offline, some embodiments learn 210 latent space of reduced-order embeddings of the original measurements of the disturbance where the latent representation of the disturbance can be modeled on a parameterized distribution with sufficient accuracy suitable for control applications. As described below, the embodiments learn a deep generative decoder model defining a mapping from a latent space of latent representations of time-series values of the disturbance affecting the mechanical system over the time horizon to the original, e.g., measurement space of the disturbance.

Notably, the latent space encodes time-series values of the disturbance affecting the mechanical system over the time horizon. For example, during the training, the time horizon can be 24 hours and the time-series values of the disturbance can be the measured disturbance affecting a system over the period of 24 hours. Hence, in this example, each sample in the latent space encodes a 24-hour-long disturbance trajectory.

During the online control, the partial observations of disturbance are collected 220, e.g., measured. For example, the disturbance is measured for the last hour. However, the prediction horizon of the SMPC can be longer than 1 hour. For example, it can be several hours or up to 24 hours in this example. Hence, there is a need to predict the remaining unseen disturbance conditioned on the partial observations of the disturbance. However, given the latent space, the embodiments, instead of trying to determine an unstructured distribution of disturbances conditioned on the partial observations in the original space of measurements, determine 230 the parameterized distribution of the latent representation of the disturbances in the latent space conditioned on the partial observations in the original measurement domains. As described above, due to the nature of the latent space, such estimation is more accurate. The conditional distribution allows the sampling 240 disturbance signals in the latent space and using 250 the decoded latent samples for disturbance-aware stochastic control 100.

To perform such an estimation, some embodiments use a mapping between the latent and the original space determined offline as a deep generative decoder model. Some embodiments are based on the realization that an autoencoder can determine such an efficient mapping in an unsupervised manner. The autoencoder is a type of artificial neural network used to learn efficient data codings in an unsupervised manner. The autoencoder includes an encoder and a decoder. The encoder encodes input data from the original data space into a latent space represented by the vector of numerical values 'h'. The decoder decodes the encodings from the latent space to an estimate of the input data, i.e., reconstructs the input data. In other words, the encoder and/or decoder provide a mapping between the data in the original data space and a latent space representation of the data. To that end, the autoencoder determines an efficient latent space suitable to capture the relationship between different instances of the input data.

The principles of the autoencoder can be extended to deep generative models, such as variational autoencoders (VAEs) or conditional variational autoencoders (CVAEs), to provide an expressive and automated approach for learning distributions in the latent space from data measured in the original space.

Figure 3:
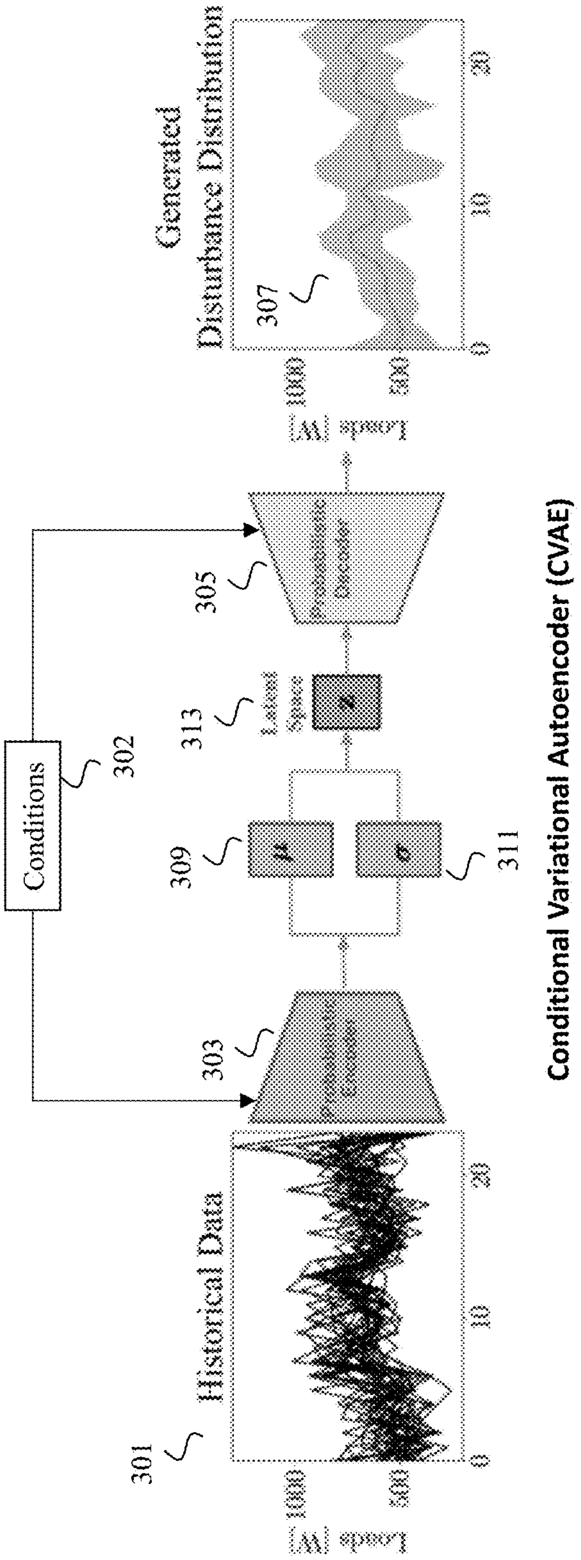
FIG. 3 shows a schematic of conditional variational autoencoders (CVAEs) employed by some embodiments to provide a mapping between the latent and the original spaces.

FIG. 3 shows a schematic of conditional variational autoencoders (CVAEs) employed by some embodiments to provide a mapping between the latent and the original spaces. The CVAE models the disturbance sequence $W \equiv W_{[0,T]} :== (w_0, \ldots, W_T)$ over a time span [0, T], optionally conditioned on an environmental variable $c \in [0, 1]^{n_c}$ 302 which captures the conditions for which disturbance inputs may change in structure, frequency, or other signal characteristics. In embodiments controlling air-conditioning systems, condition c includes seasons, workday vs. weekend, average diurnal temperature, humidity, and/or average solar radiation, geographical location (when considering multiple buildings).

Various embodiments use a probabilistic deep learning method that learns a latent space by encoding disturbance signal data; this latent space can be interpreted as a conditional probability distribution: sampling which, one can obtain disturbance signals by decoding. The CVAE includes an encoder 303 that compresses data signals W 301, given conditional inputs c 302, to a latent representation z 313 in a latent space within $\mathbb{R}^{n_z}$, and a decoder 305 that is trained to reconstruct the data from the learned latent representation.

The generative model is specified by the distribution $\pi_\theta(W|z, c)$ where z is sampled from a latent prior distribution $\pi(z)$ and $\theta$ are the encoder weights. This implicitly specifies the conditional distribution:

$$\pi(W \mid c) = \int \pi(W \mid z, c)\pi(z)dz.$$

In principle, the learning objective is to maximize the expected log-likelihood, i.e., $$\max_\theta E[\log \pi_\theta(W \mid c)].$$

However, this implicit conditional distribution is generally intractable, which motivates the introduction of a variational posterior $q_\phi(z|W, c)$ that approximates the actual posterior; $\phi$ are the decoder weights. This $q_\phi$ is utilized in a variational lower bound of the expected log-likelihood, also known as the evidence lower bound (ELBO)

$$E[\log \pi_\theta(W \mid c)] \geq E[\log \pi_\theta(W \mid z, c) + KLD(q_\phi(z \mid W, c) \| \pi(z))].$$

The parameters $(\theta, \phi)$ of the CVAE are jointly optimized to maximize the ELBO. Note that the variational posterior is typically parameterized as a conditional Gaussian:

$$q_\phi(z \mid W, c) = \mathcal{N}\left(z; \mu_\phi(W, c), \sum\nolimits_\phi(W, c)\right),$$

with the mean vector $\mu_\phi$ 309 and diagonal covariance matrix $\Sigma_\phi$ 311 given by parametric functions of (x, s). With the typical assumption of a latent prior distribution being the standard Gaussian distribution, the KLD term in ELBO is readily tractable and differentiable.

The variational posterior can be viewed as an encoder that induces a probabilistic map from W to a latent representation z, conditioned on c. The generative model can be viewed as a decoder that recovers likelihoods for W, conditioned on c, from a sampled latent representation z. This decoder can also be parameterized as a conditional Gaussian, where the mean vector is a parametric function of (z, c) and the covariance is the identity matrix. This simplifies the first term of the ELBO in to be essentially a negative reconstruction loss, i.e., shift-scale of mean-square error (MSE).

Given a trained VAE, the decoder can be used to generate synthetic data 307 by sampling from the latent variables, $\pi_\theta(W|z, c)$. This is done by drawing a latent vector z from its prior distribution, and subsequently, for a given c, employing the generative model to specify the distribution $\pi_\theta(W|z, c)$ from which the synthetic data should be sampled.

However, the deep generative decoder model 305 is trained offline from the training data of measured disturbances without consideration of the current partially observed disturbances acting on the mechanical system. To address the partial observations, the embodiments use the deep generative decoder model to determine a conditional probabilistic distribution of the latent representations of the disturbance conditioned on the partial observations of the disturbance.

Figure 4:
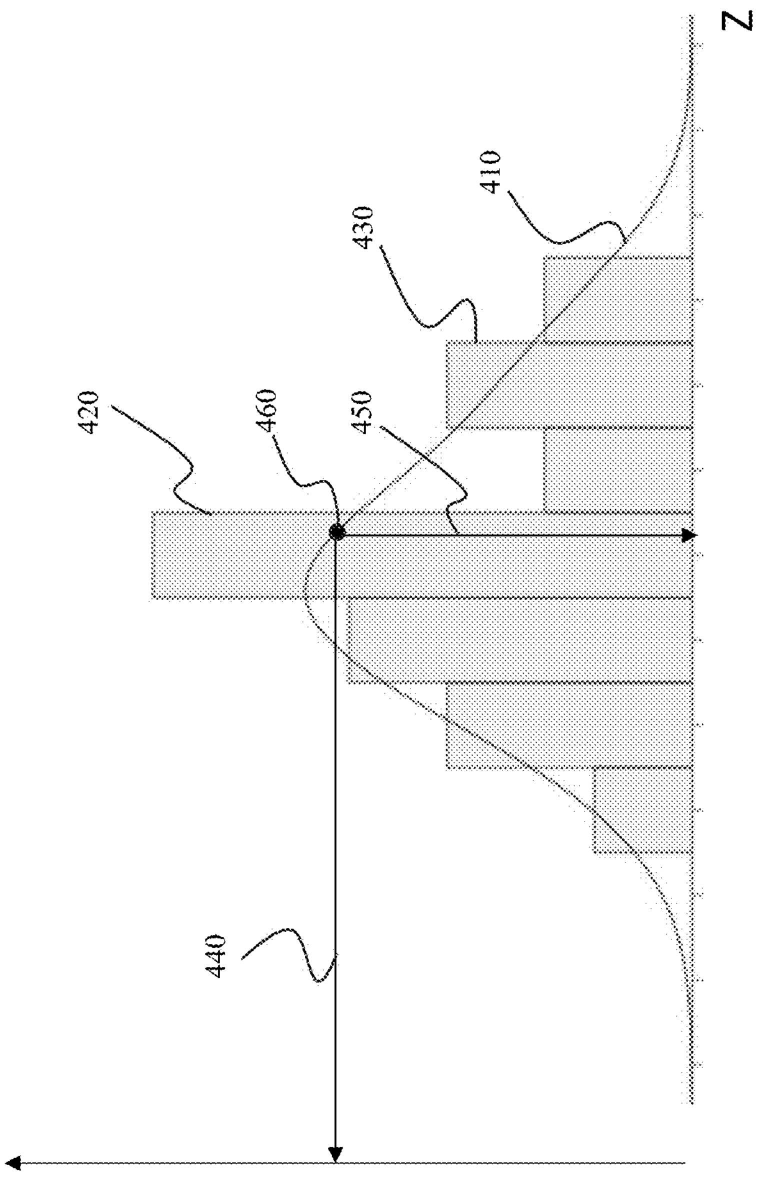
FIG. 4 shows a schematic of an exemplary conditional probabilistic distribution of the latent representations according to some embodiments.

FIG. 4 shows a schematic of an exemplary conditional probabilistic distribution of the latent representations according to some embodiments. The conditional probabilistic distribution 410 of the latent representations of the disturbance is determined based on a comparison of corresponding portions of a set of latent representations decoded by the deep generative decoder model with the partial observations of the disturbance. For example, in the example of FIG. 4, decodings of the latent samples from area 420 are more likely to fit the partial observations than decodings of the latent samples from area 420.

Some embodiments sample 460 the conditional distribution 410 to produce a latent sample 450 and its probability 440 to represent the partial observations. The decoding of the latent sample 450 and its probability 440 are used by SMPC for the stochastic control.

Different embodiments use different techniques to determine the conditional distribution 410. For example, some embodiments determine the conditional probabilistic distribution of the latent representations of the disturbance based on a comparison of corresponding portions of a set of latent representations decoded by the deep generative decoder model with the partial observations of the disturbance.

Figure 5:
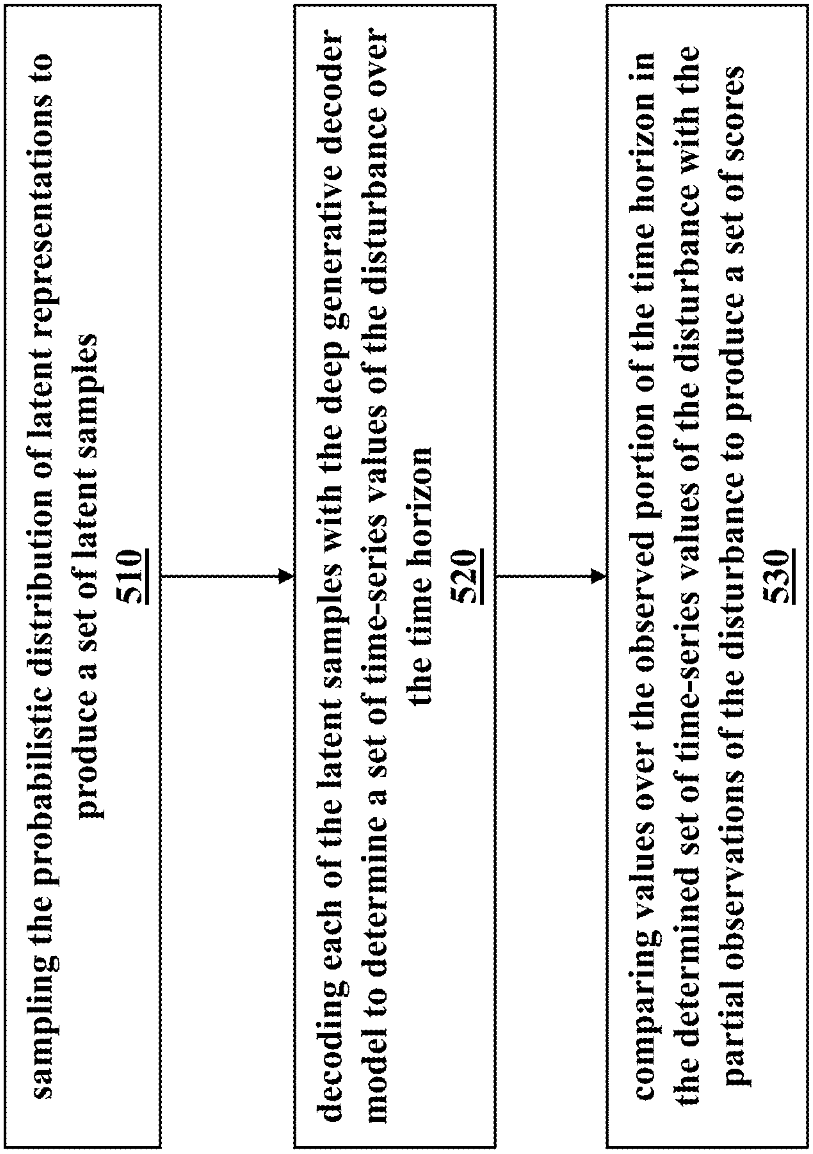
FIG. 5 shows a flow chart of a method for determining the conditional probabilistic distribution of the latent representations of the disturbance according to some embodiments.

FIG. 5 shows a flow chart of a method for determining the conditional probabilistic distribution of the latent representations of the disturbance according to some embodiments. The method includes sampling 510 the probabilistic distribution of latent representations to produce a set of latent samples; decoding 520 each of the latent samples with the deep generative decoder model to determine a set of time-series values of the disturbance over the time horizon, wherein each of time-series values of the disturbance includes values over the observed portion of the time horizon; and comparing 530 values over the observed portion of the time horizon in the determined set of time-series values of the disturbance with the partial observations of the disturbance to produce a set of scores.

These scores are used to build the conditional distribution 410. For example, some embodiments iteratively repeat the sampling 510, the decoding 520, and the comparing 530 until a termination condition is met to reduce an error between the values over the observed portion of the time horizon in the determined set of time-series values of the disturbance and the partial observations of the disturbance. Doing this in such a manner allows for identifying the area of the latent space with a higher probability of fitting the partial observation of the disturbance. The observed error is used to estimate the conditional probability of different samples.

For example, given pre trained decoder model, during an online control of the mechanical system at the current time t, the embodiments collect partial observations of measured disturbances $W_{0:t}=(w_0, \ldots, w_t)$ and aim to leverage a pre-trained CVAE model to provide a distributional forecast of the remaining unknown sequence $W_{t+1:T}=(w_{t+1}, \ldots, w_T)$. Formally speaking, the aim is to extract and sample the conditional distribution $\pi(W_{t+1:T}|W_{0:t},c)$ from the model learned by the CVAE.

However, this specific conditional dependency structure is not directly provided by the CVAE. Instead, the embodiments first extract the latent representation distribution conditioned on only the partially revealed perturbations, $\pi(z|W_{0:t}, c)$, equivalently, to identify a subspace in the latent space that is most likely to have generated the observed disturbance sequence $W_{0:t}$ conditioned upon c. Then, by sampling latents from this distribution $z \sim \pi(z|W_{0:t}, c)$, the embodiments apply the CVAE decoder model to sample the corresponding completed sequences, including the unseen portions $W_{t+1:T}$, which is equivalent to predicting (probabilistically) 211 the disturbance input signal.

The conditional latent distribution $\pi(z|W_{0:t}, c)$, although not known in closed form, can be defined using Bayes' rule. Formally, the latent probability distribution conditioned on the partially revealed sequence is defined as, $$\pi(z \mid W_{0:t}, c) = \frac{\pi(Z \mid C)\pi(W_{0:t} \mid z, c)}{\pi(W_{0:t} \mid c)}.$$

Figure 6:
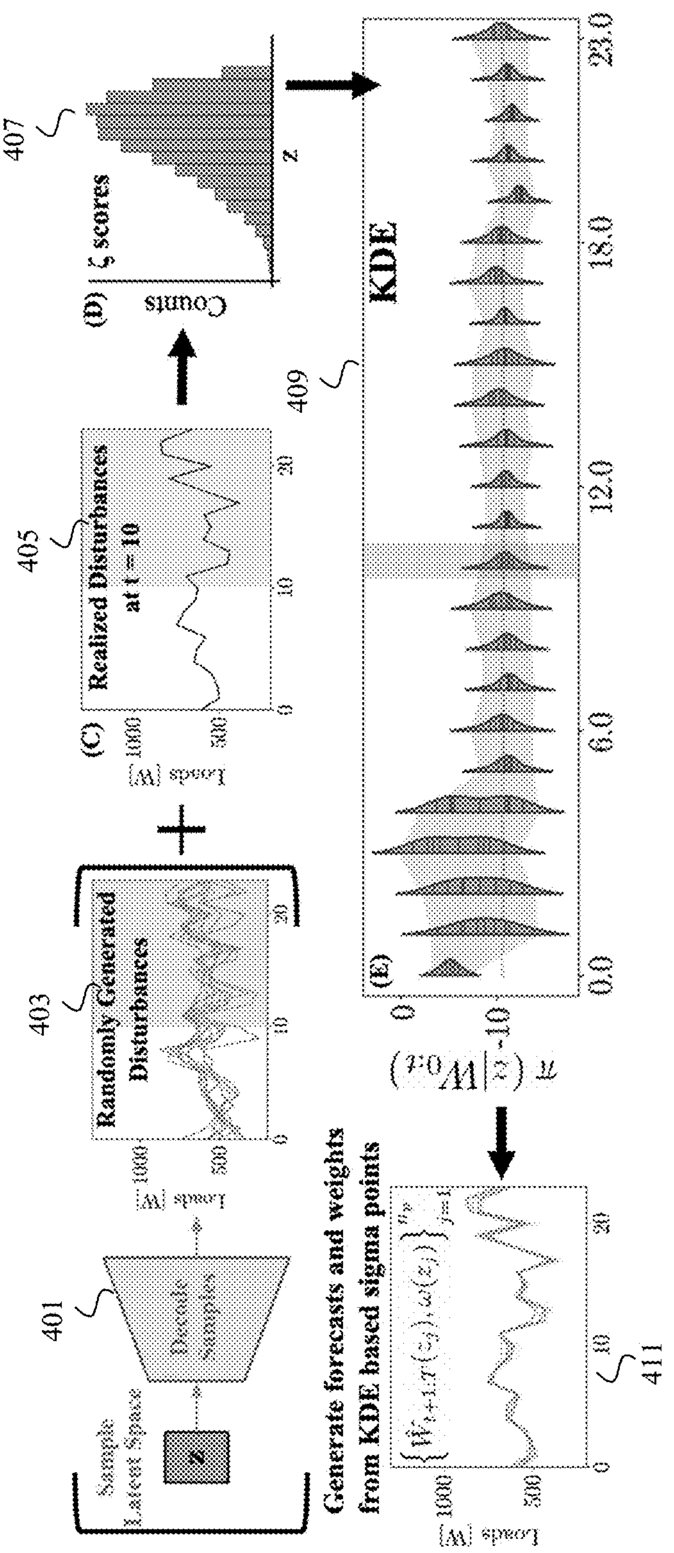
FIG. 6 shows a schematic of an embodiment employing sigma points derived from the estimated scores to produce the conditional probability.

FIG. 6 shows a schematic of an embodiment employing sigma points derived from the estimated scores to produce the conditional probability. The embodiment generates m samples z over a learned latent space 401, and decodes the latent samples 403 with the deep generative decoder model to produce the corresponding reconstructions of the seen portion of the disturbance sequences $$\{\widehat{W_{0:t}(z_i)}\}_{i=1}^{m}.$$

The embodiment compares the reconstruction with the partially observed disturbance. For example, one implementation of the embodiment uses the coefficient of determination (the square of the Pearson correlation coefficient) on each reconstruction 403 with the original partially observed sequence of the disturbance 405 to assign a score 407 to the likelihood of each corresponding sample $z_i$, as given by, $$\zeta_i = \frac{\alpha}{1 - R\left(\hat{W}_{0:t}(z_i), W_{0:t}\right)^2}$$

with scalar a>0.

These zeta-scores 407 enable the approximation of the likelihood $\pi(z|W_{0:t})$ using kernel density estimation (KDE) 409. The KDE can be sampled to obtain $n_p$ sigma points in the latent space, where we recall that $n_p=2n_z+1$ and $n_z$ is the dimension of the latent distribution. After KDE approximation and sigma-point construction, the likelihood $\pi(z|W_{0:t})$ gradually adapts 409 to a latent vector likely to have generated W_{0:t}.

These latent samples, along with their probabilities, are then passed to the decoder to produce conditionally sampled forecasts of the unseen portion of the disturbance sequence and weights 411 which are subsequently passed to the SMPC through the predicted dynamics.

Figure 7:
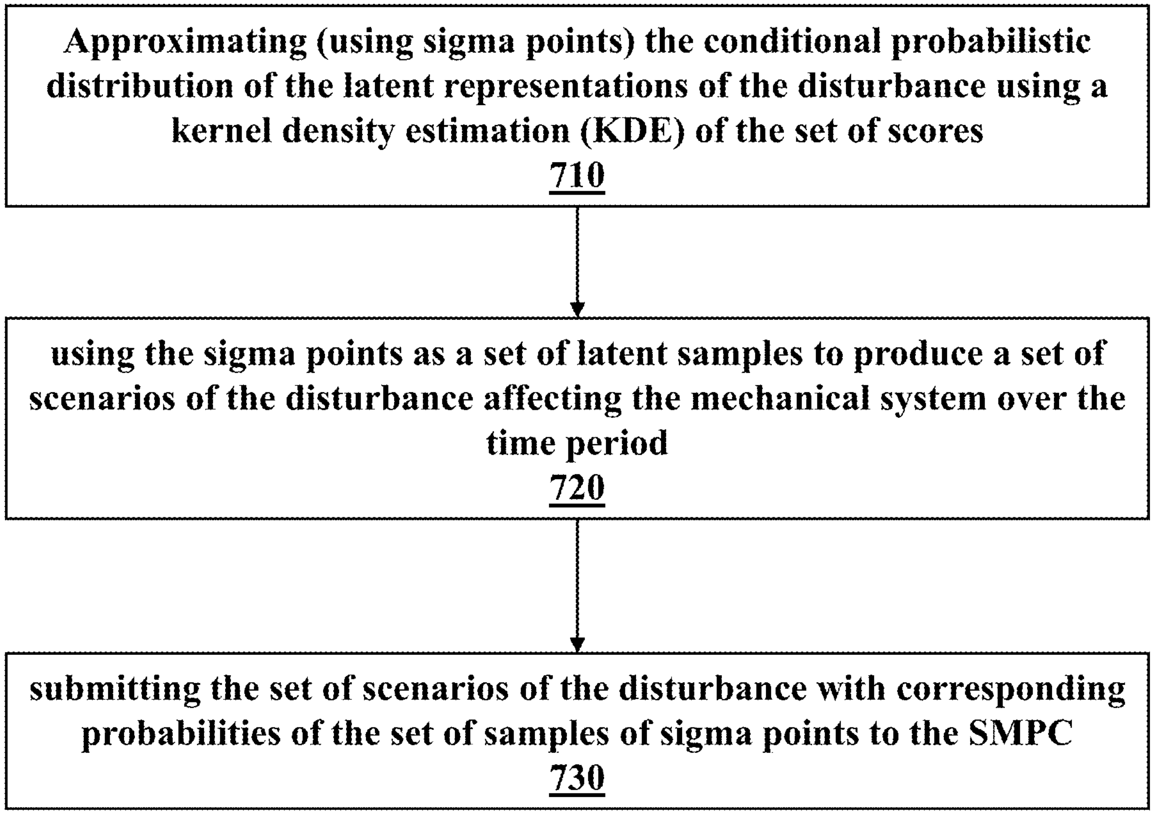
FIG. 7 shows a flowchart of a method employing principles described in relation to FIG. 6.

FIG. 7 shows a flowchart of a method employing principles described in relation to FIG. 6. The method includes approximating 710 the conditional probabilistic distribution of the latent representations of the disturbance conditioned on the partial observations of the disturbance using a kernel density estimation (KDE) of the set of scores. For example, the conditional probabilistic distribution is approximated as a set of samples of sigma points on the KDE of the set of scores. Next, the method uses 720 the set of samples of sigma points as a set of latent samples of the time-series values of the disturbance affecting the mechanical system over the time horizon to produce a set of scenarios of the disturbance affecting the mechanical system over the time period and submits 730 the set of scenarios of the disturbance with corresponding probabilities of the set of samples of sigma points to the predictive controller to produce the control commands by optimizing a cost function of the set of the scenarios weighted with the corresponding probabilities.

Figure 8:
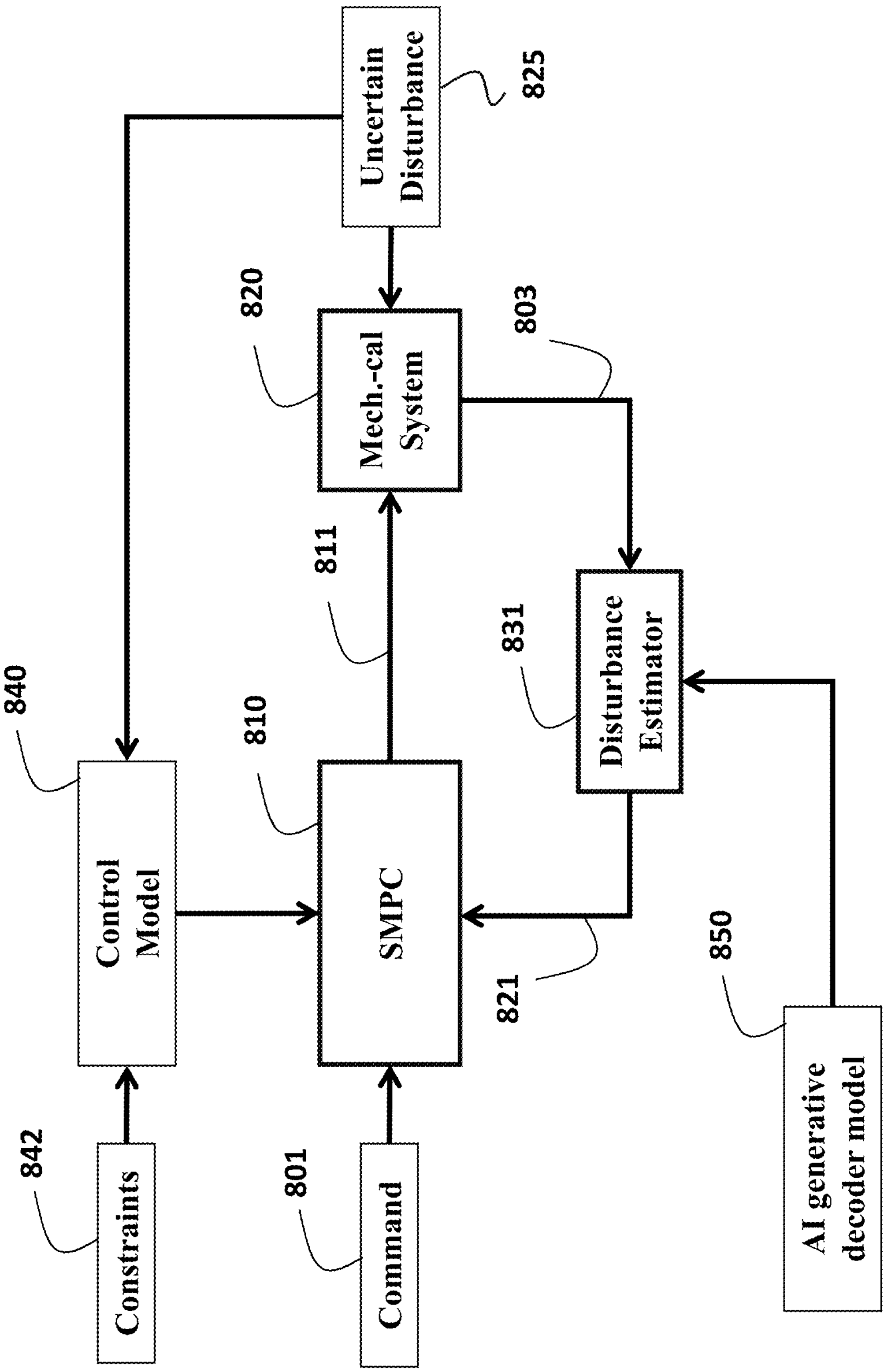
FIG. 8 shows an example system with uncertainty, connected to a stochastic model predictive controller (SMPC) via a disturbance estimator according to some embodiments.

FIG. 8 shows an example system 820 with uncertainty 825, connected to a stochastic model predictive controller (SMPC) 810 via a disturbance estimator 831 according to some embodiments. The SMPC is programmed according to a dynamical model 840, i.e., a control model of the system. The model can be a set of equations representing changes in the state and output 803 of the system 820 over time as functions of current and previous inputs 811 and previous outputs 803. The model can include constraint 842 which represents the physical and operational limitations of the system. During the operation, the controller receives a command 801 indicating the desired behavior of the system. The command can be, e.g., a motion command. In response to receiving the command 801, the controller generates a control signal 811 that serves as an input for the mechanical system 820 affected by the disturbance 825. In response to the input, the system updates the output 803 of the system. Based on measurements of the output of system 803 and an AI deep generative decoder model 850, the estimator 831 predicts 821 the disturbance 825, and its uncertainty. These estimates 821 are submitted to controller 810.

The mechanical system 820, as referred to herein, can be any machine or device controlled by certain manipulation input signals 811 (inputs), possibly associated with physical quantities such as voltages, pressures, forces, and torques, and to return some controlled output signals 803 (outputs), possibly associated to physical quantities such as currents, flows, velocities, positions indicative of a transition of a state of the system from a previous state to the current state. The output values are related in part to previous output values of the system and in part to previous and current input values. The dependency on previous inputs and previous outputs is encoded in the state of the system. The operation of the system, e.g., a motion of components of the system, can include a sequence of output values generated by the system following the application of certain input values.

The uncertain disturbance 825 can be any time-varying signal, including any external disturbances, forces or torques acting on the system 820, any unmodeled dynamics, or any uncertainties in physical quantities such as uncertain friction coefficients, friction functions, a mass of a body, center of gravity of the system, or uncertain coefficients and parameters in the control model equations that describe the physical behavior of the real system 820. For example, in some implementations, the SMPC 810 uses a simplified control model 840, resulting in a large amount of the physical behavior in the mechanical system remaining unmodeled, to reduce the computational complexity of the controller or because some of the physical behavior is too complex and therefore difficult or impossible to model by first principles. Such simplified modeling can cause or contribute to the uncertainty 825. Note that time-independent uncertainties can be estimated or learned, either online or offline, as part of the state and parameter estimator 831.

In various embodiments, the estimator 831 is an online estimator that determines the uncertain disturbance 825 and/or confidence about the estimated uncertainty in real-time, i.e., during the control of the system 820. In such a manner some embodiments increase the accuracy of the estimation of the uncertainty 825 with respect to the accuracy of offline estimation of the uncertainties because the uncertainty 825 is changing with time and may depend on the control inputs and the system response to such control inputs.

A control model 840 can include a dynamic model defining the dynamics of the system 820. The control model 840 of mechanical system 820 can include a set of mathematical equations that describe how the system outputs change over time as functions of current and previous inputs and the previous outputs. The state of the system is any set of information, in general time-varying, for instance, an appropriate subset of current and previous inputs and outputs, that, together with the model of the system and future inputs, can uniquely define the future motion of the system. The mechanical system 820 can be subject to physical limitations and specification constraints 842 limiting the range where the outputs, the inputs, and also possibly the states of the system are allowed to operate. In various embodiments, the control model of the system includes a function of dynamics of the system having the parameter with the uncertainty 825. In such a manner, the uncertainty acting on the system 820 can be captured by the model 840.

The controller 810 can be implemented in hardware or as a software program executed in a processor, e.g., a microprocessor, which at fixed or variable control period sampling intervals receives the estimated state of the system 821 and the desired motion command 801 and determines, using this information, the inputs, e.g., the control signal 811, for operating the system.

The estimator 831 can be implemented in hardware or as a software program executed in a processor, either the same or a different processor from the controller 810, which at fixed or variable control period sampling intervals receives the outputs of the system 803 and determines, using the new and the previous output measurements, the estimated disturbance and its uncertainty 821 of the system 820.

Figure 9:
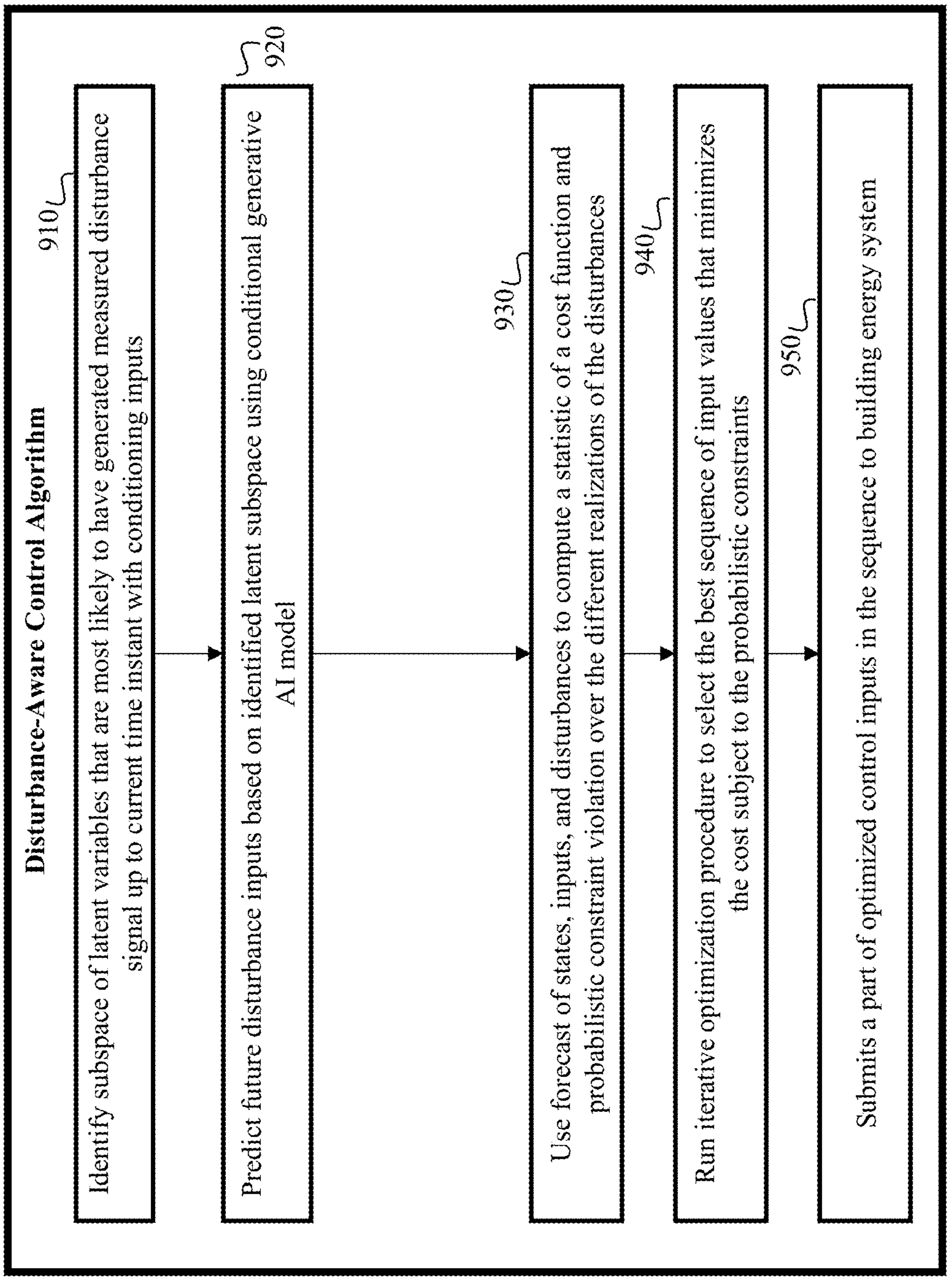
FIG. 9 shows a diagram of a method implemented by SMPC of FIG. 8 according to some embodiments.

FIG. 9 shows a diagram of a method implemented by SMPC of FIG. 8 according to some embodiments. Given a deep generative decoder model defining a mapping from a latent space of latent representations of time-series values of the disturbance affecting the mechanical system over the time horizon to a measurement space of the partial observations of the disturbance, the method identifies 910 subspace of latent variables that are most likely to have generated measured disturbance signal up to current time instant with conditioning inputs. The identifying 910 can be implemented as conditional probabilistic distribution of the latent representations of the disturbance conditioned on the partial observations of the disturbance.

Using the identified subspace of latent variables, the method predicts 920 future disturbance inputs based on the identified latent subspace using the deep generative decoder model and uses this prediction to forecast 930 states, inputs, and disturbances to compute a statistic of a cost function and probabilistic constraint violation over the different realizations of the disturbances, e.g., as described with respect to FIG. 8. For example, the SMPC determines the control commands by optimizing a cost function over a prediction horizon including the observed portion of the time horizon and an unobserved portion of the time horizon, wherein time-series values of the disturbance affecting the mechanical system over the prediction horizon include the partial observations of the disturbance complemented with a portion of the predicted values of the disturbance for the unobserved portion of the time horizon. Notably, in different implementations, the prediction horizon is shorter than the time horizon or equal to the time horizon of the decoded disturbance.

Next, the SMPC runs 940 iterative optimization procedure to select the best sequence of input values that minimizes the cost subject to the probabilistic constraints over the prediction horizon and submits 950 a part of optimized control inputs in the sequence to the actuators of the mechanical system.

Figure 10A:
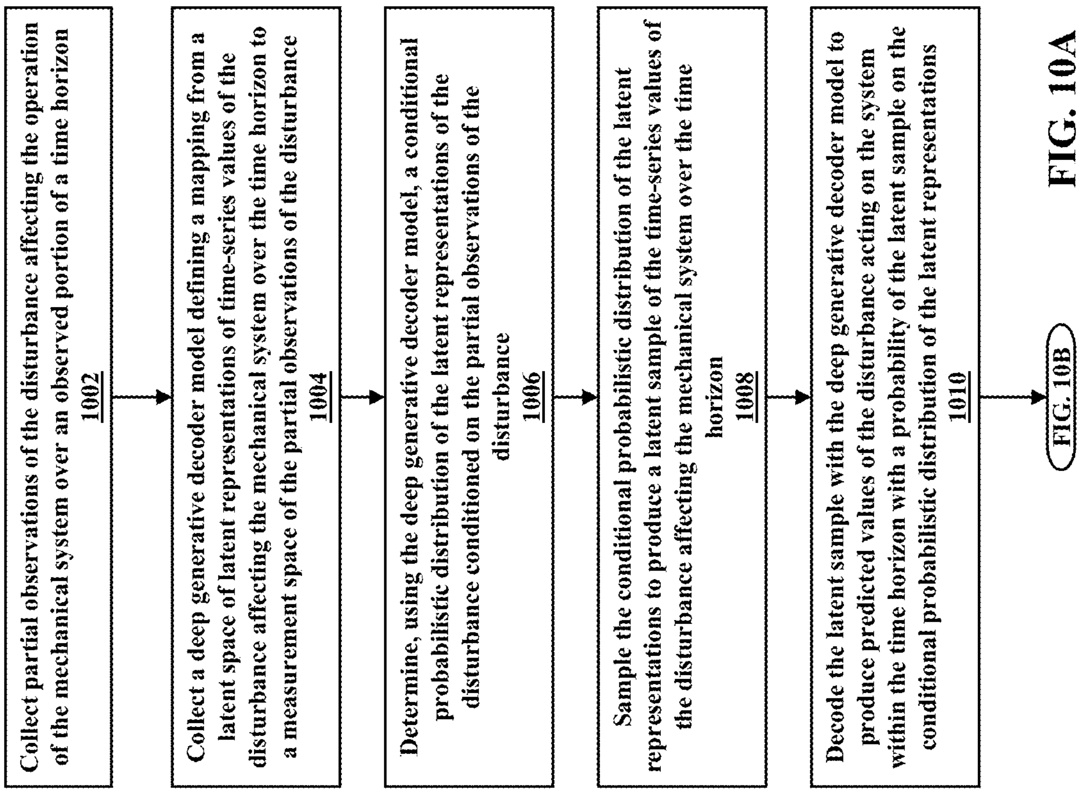
FIGS. 10A-10B show a flowchart of an example process according to some embodiments.
Figure 10B:
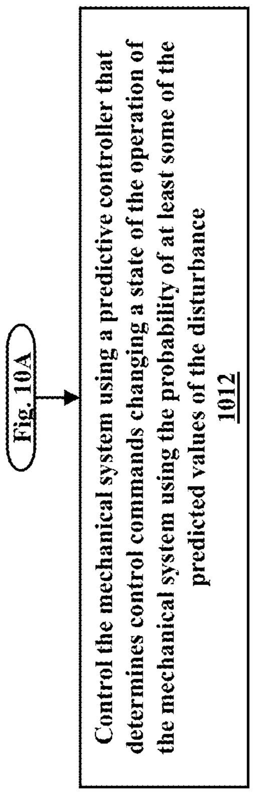

FIGS. 10A-10B show a flowchart of an example process 1000. In some implementations, one or more process blocks of FIGS. 10A-10B may be performed by a processor. As shown in FIGS. 10A-10B, process 1000 may include collecting partial observations of the disturbance affecting the operation of the mechanical system over an observed portion of a time horizon (block 1002). For example, processor may collect partial observations of the disturbance affecting the operation of the mechanical system over an observed portion of a time horizon, as described above. As also shown in FIGS. 10A-10B, process 1000 may include collecting a deep generative decoder model defining a mapping from a latent space of latent representations of time-series values of the disturbance affecting the mechanical system over the time horizon to a measurement space of the partial observations of the disturbance (block 1004). For example, processor may collect a deep generative decoder model defining a mapping from a latent space of latent representations of time-series values of the disturbance affecting the mechanical system over the time horizon to a measurement space of the partial observations of the disturbance, as described above.

As further shown in FIGS. 10A-10B, process 1000 may include determining, using the deep generative decoder model, a conditional probabilistic distribution of the latent representations of the disturbance conditioned on the partial observations of the disturbance (block 1006). For example, processor may determine, using the deep generative decoder model, a conditional probabilistic distribution of the latent representations of the disturbance conditioned on the partial observations of the disturbance, as described above.

As also shown in FIGS. 10A-10B, process 1000 may include sampling the conditional probabilistic distribution of the latent representations to produce a latent sample of the time-series values of the disturbance affecting the mechanical system over the time horizon (block 1008). For example, processor may sample the conditional probabilistic distribution of the latent representations to produce a latent sample of the time-series values of the disturbance affecting the mechanical system over the time horizon, as described above.

As further shown in FIGS. 10A-10B, process 1000 may include decoding the latent sample with the deep generative decoder model to produce predicted values of the disturbance acting on the system within the time horizon with a probability of the latent sample on the conditional probabilistic distribution of the latent representations (block 1010). For example, processor may decode the latent sample with the deep generative decoder model to produce predicted values of the disturbance acting on the system within the time horizon with a probability of the latent sample on the conditional probabilistic distribution of the latent representations, as described above.

As also shown in FIGS. 10A-10B, process 1000 may include controlling the mechanical system using a predictive controller that determines control commands changing a state of the operation of the mechanical system using the probability of at least some of the predicted values of the disturbance (block 1012). For example, processor may control the mechanical system using a predictive controller that determines control commands changing a state of the operation of the mechanical system using the probability of at least some of the predicted values of the disturbance, as described above.

Although FIGS. 10A-10B shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 shows a pseudo-code for performing SMPC using scenario trees according to some embodiments. While SMPC is an extension of MPC that accounts for uncertainties in the system by modeling them as stochastic processes, the scenario trees are a tool used in stochastic MPC to represent and handle these uncertainties. Some embodiments are based on recognizing that the scenario trees can be advantageously used to handle different predictions of the disturbance sampled with different probabilities on the conditional distribution.

As a skilled artisan readily recognizes, scenario trees are constructed to represent different possible realizations of the uncertain variables over a prediction horizon. Each branch of the tree corresponds to a particular scenario or realization of the uncertainties. Nodes in the scenario tree represent decision points in time, such as sampling instants for control inputs or prediction steps. At each node, the system faces a decision, and the tree branches based on different possible outcomes. Each branch of the scenario tree is associated with a probability weight that reflects the likelihood of that particular scenario occurring. As described above, these probabilities are estimated based on the conditional distribution.

The objective function in stochastic MPC is defined as the expected cost over all possible scenarios, taking into account the probability of each scenario. This involves weighting the cost associated with each scenario by its probability of occurrence. The optimization problem in stochastic MPC involves finding the control inputs that minimize the expected cost over the entire scenario tree. This leads to a more robust controller that performs well on average across different possible outcomes.

Stochastic MPC typically employs a receding horizon control strategy. At each time step, the controller solves the optimization problem over the current scenario tree, implements the first set of control inputs, and then updates the scenario tree based on new measurements. As time progresses, the actual system behavior is observed, and the scenario tree may be updated to incorporate new information. This adaptive approach helps the controller become more accurate over time.

Scenario trees provide a structured way to handle uncertainties and make decisions in a stochastic environment. They allow the MPC controller to explicitly consider multiple possible disturbance scenarios, making the control strategy more robust and capable of handling real-world uncertainties.

FIG. 12 shows a pseudo-code for exemplar implementation scenario trees of SMPC of FIG. 11 for building energy control according to some embodiments. This implementation is based on recognizing that although the conditional distribution is not available in closed form, it can be numerically approximated. First, note that $\pi(W_{0:T}|z, c)$ is defined by the decoder, which uses the learned distribution and reparameterization to generate samples $\hat{W}_{0:T}$. By assuming a Gaussian prior centered on the evidence, the embodiments can numerically evaluate the conditional probability of latent samples, using $$\pi(W_{0:t} \mid z, c) = \frac{1}{\beta}\exp\left(\frac{-\delta_M\left(\mu_{\theta,0:t}, \sum_{\theta,0:t}^{-1}\right)^2}{2}\right)$$

where $\delta_M$ is the Mahalanobis distance, and $\beta$ is the pre-exponential factor for a multivariate Gaussian. We can now generate forecasts and compute their respective probability by jointly sampling the decoder and probability function.

Given $\pi(z|W_{0:t}, c)$ and disturbance forecasts $W_{t+1:T}$, we require a scenario selection strategy to select the forecasts to use in the SMPC. Construction of the scenario tree for non-i.i.d. disturbances require the transition probabilities between any two consecutive states in a scenario. However, when building a scenario tree from generated forecasts, state-transition probabilities $\pi(W_{i+1}|W_i, c)\ \forall i\in[t:T-1]$ are not known and would be expensive to compute. Instead, generated samples can be directly used in a single-stage robust horizon decision tree, where each scenario is a generated forecast.

Given that the learned distribution can produce all possible scenarios, it will also contain all the scenarios of a tree with arbitrarily long robust horizons, without the need for explicitly defining branches and transition probabilities. Thus, by taking a subset of forecasts can be likened to a pruned scenario tree.

Different implementations utilize different strategies for the scenario selection. For example, in one embodiment the scenarios are generated by using the most probable forecasts $A\subset\{\hat{W}_{t+1:T}(z)\}$, and generating scenarios $$\hat{W}_{t+1:T}^{(1)} = \mathbb{E}[A] + \xi_0\sigma(A)$$

$$\hat{W}_{t+1:T}^{(2)} = \mathbb{E}[A] + \xi_2\sigma(A)$$

$$\hat{W}_{t+1:T}^{(3)} = \mathbb{E}[A] + \xi_3\sigma(A)$$

$$\ldots$$

-continued $$\hat{W}_{t+1:T}^{(n_s)} = \mathbb{E}[A] + \xi_{n_s}\sigma(A),$$

for a user-specified $n_s$, generated using the mean and standard deviation over A. The scalars $\xi=[\xi_0, \xi_1, \ldots, \xi_n]$ can be used to select lower probability scenarios, using the normalized probability values of an isotropic Gaussian as the weights. Thus using a single scenario is equivalent to a MPC implementation, and increasing the number of scenarios and/or values of $\xi$ results in more conservative control.

Additionally or alternatively, for non-adaptive strategies, the scenarios can be generated as outlined above, except where a is the set of most probable scenarios generated by sampling $z\sim\mathcal{N}(0,1)$, i.e., the unconditioned prior.

The control decisions are made using a scenario-tree SMPC framework 1241 where the scenarios have been generated as discussed above. Here $\omega^s$ 1231 is the weight for scenario s, and $\ell_k$ is a stage cost function such as energy or deviation from a comfortable temperature zones, or an economic objective. Additionally, $$\hat{x}_k^s, \hat{w}_k^s$$

are the predicted states and forecasted disturbance values via the dynamics 1221 and the generative AI method 1211, and g is a set of probabilistic constraint functions. Considering the above, the embodiments can therefore forecast states, inputs, and disturbances to compute a statistic of a cost function and probabilistic constraint violation over the different realizations of the disturbances.

Consequently, the SMPC can solve this scenario-tree optimal control problem using various iterative optimization methods, and send a part of the optimal control solution to the building energy system.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. However, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for predictive control of an operation of a mechanical system subject to uncertainty of a disturbance acting on the mechanical system, wherein the method is using a processor coupled with stored instructions implementing steps of the method, comprising:

collecting partial observations of the disturbance affecting the operation of the mechanical system over an observed portion of a time horizon;

collecting a deep generative decoder model defining a mapping from a latent space of latent representations of time-series values of the disturbance affecting the mechanical system over the time horizon to a measurement space of the partial observations of the disturbance;

determining, using the deep generative decoder model, a conditional probabilistic distribution of the latent representations of the disturbance conditioned on the partial observations of the disturbance;

sampling the conditional probabilistic distribution of the latent representations to produce a latent sample of the time-series values of the disturbance affecting the mechanical system over the time horizon;

decoding the latent sample with the deep generative decoder model to produce predicted values of the disturbance acting on the system within the time horizon with a probability of the latent sample on the conditional probabilistic distribution of the latent representations;

determining control commands by a predictive controller based on the probability of at least some of the predicted values of the disturbance; and controlling the mechanical system by changing a state of the operation of the mechanical system based on the control commands generated by the predictive controller.

2. The method of claim 1, wherein the predictive controller is a stochastic model predictive controller (SMPC).

3. The method of claim 1, wherein the conditional probabilistic distribution of the latent representations of the disturbance is determined based on a comparison of corresponding portions of a set of latent representations decoded by the deep generative decoder model with the partial observations of the disturbance.

4. The method of claim 3, further comprising:

sampling the probabilistic distribution of latent representations to produce a set of latent samples;

decoding each of the latent samples with the deep generative decoder model to determine a set of time-series values of the disturbance over the time horizon, wherein each of time-series values of the disturbance includes values over the observed portion of the time horizon; and comparing values over the observed portion of the time horizon in the determined set of time-series values of the disturbance with the partial observations of the disturbance to produce a set of scores.

5. The method of claim 4, further comprising:

iteratively repeating the sampling, the decoding, and the comparing until a termination condition is met to reduce an error between the values over the observed portion of the time horizon in the determined set of time-series values of the disturbance and the partial observations of the disturbance.

6. The method of claim 4, further comprising:

approximating the conditional probabilistic distribution of the latent representations of the disturbance conditioned on the partial observations of the disturbance using a kernel density estimation (KDE) of the set of scores.

7. The method of claim 6, wherein the conditional probabilistic distribution is approximated as a set of samples of sigma points on the KDE of the set of scores.

8. The method of claim 7, further comprising:

using the set of samples of sigma points as a set of latent sample of the time-series values of the disturbance affecting the mechanical system over the time horizon to produce a set of scenarios of the disturbance affecting the mechanical system over the time period; and submitting the set of scenarios of the disturbance with corresponding probabilities of the set of samples of sigma points to the predictive controller to produce the control commands by optimizing a cost function of the set of the scenarios weighted with the corresponding probabilities.

9. The method of claim 1, wherein the predictive controller determines the control commands by optimizing a cost function over a prediction horizon including the observed portion of the time horizon and an unobserved portion of the time horizon, wherein the prediction horizon is shorter than the time horizon, wherein time-series values of the disturbance affecting the mechanical system over the prediction horizon include the partial observations of the disturbance complemented with a portion of the predicted values of the disturbance for the unobserved portion of the time horizon.

10. The method of claim 1, wherein the predictive controller determines the control commands by optimizing a cost function over the time horizon including the observed portion of the time horizon and an unobserved portion of the time horizon, wherein time-series values of the disturbance affecting the mechanical system over the time horizon include the partial observations of the disturbance complemented with a portion of the predicted values of the disturbance for the unobserved portion of the time horizon.

11. The method of claim 1, wherein the deep generative decoder model is trained to decode the latent representations of the disturbance subject to a condition.

12. The method of claim 11, wherein the mechanical system is an air conditioning system, and wherein the condition includes one or a combination of a time of a day, a season, designation of weekdays or weekends, and a heat load.

13. A device for predictive control of an operation of a mechanical system subject to uncertainty of a disturbance acting on the mechanical system comprising:

one or more processors configured to:

collect partial observations of the disturbance affecting the operation of the mechanical system over an observed portion of a time horizon;

collect a deep generative decoder model defining a mapping from a latent space of latent representations of time-series values of the disturbance affecting the mechanical system over the time horizon to a measurement space of the partial observations of the disturbance;

determine, using the deep generative decoder model, a conditional probabilistic distribution of the latent representations of the disturbance conditioned on the partial observations of the disturbance;

sample the conditional probabilistic distribution of the latent representations to produce a latent sample of the time-series values of the disturbance affecting the mechanical system over the time horizon;

decode the latent sample with the deep generative decoder model to produce predicted values of the disturbance acting on the system within the time horizon with a probability of the latent sample on the conditional probabilistic distribution of the latent representations;

determine control commands by a predictive controller based on the probability of at least some of the predicted values of the disturbance; and control the mechanical system by changing a state of the operation of the mechanical system based on the control commands generated by the predictive controller.

14. The device of claim 13, wherein the predictive controller is a stochastic model predictive controller (SMPC).

15. The device of claim 13, wherein the conditional probabilistic distribution of the latent representations of the disturbance is determined based on a comparison of corresponding portions of a set of latent representations decoded by the deep generative decoder model with the partial observations of the disturbance.

16. The device of claim 13, wherein the one or more processors are further configured to:

use the set of samples of sigma points as a set of latent sample of the time-series values of the disturbance affecting the mechanical system over the time horizon to produce a set of scenarios of the disturbance affecting the mechanical system over the time period; and submit the set of scenarios of the disturbance with corresponding probabilities of the set of samples of sigma points to the predictive controller to produce the control commands by optimizing a cost function of the set of the scenarios weighted with the corresponding probabilities.

17. The device of claim 13, wherein the predictive controller determines the control commands by optimizing a cost function over a prediction horizon including the observed portion of the time horizon and an unobserved portion of the time horizon, the prediction horizon is shorter than the time horizon, time-series values of the disturbance affecting the mechanical system over the prediction horizon include the partial observations of the disturbance complemented with a portion of the predicted values of the disturbance for the unobserved portion of the time horizon.

18. The device of claim 13, wherein the predictive controller determines the control commands by optimizing a cost function over the time horizon including the observed portion of the time horizon and an unobserved portion of the time horizon, time-series values of the disturbance affecting the mechanical system over the time horizon include the partial observations of the disturbance complemented with a portion of the predicted values of the disturbance for the unobserved portion of the time horizon.

19. The device of claim 13, wherein the deep generative decoder model is trained to decode the latent representations of the disturbance subject to a condition.

20. The device of claim 19, wherein the mechanical system is an air conditioning system, and the condition includes one or a combination of a time of a day, a season, designation of weekdays or weekends, and a heat load.

* * * * *